(12) United States Patent
Wang

(10) Patent No.: US 8,802,230 B2
(45) Date of Patent: Aug. 12, 2014

(54) ELECTRICALLY-INSULATIVE COATING, COATING SYSTEM AND METHOD

(75) Inventor: Yucong Wang, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 997 days.

(21) Appl. No.: 12/642,334

(22) Filed: Dec. 18, 2009

(65) Prior Publication Data

US 2011/0151245 A1  Jun. 23, 2011

(51) Int. Cl.
*B32B 15/00* (2006.01)
*B05D 5/12* (2006.01)

(52) U.S. Cl.
USPC ........... 428/379; 428/375; 428/372; 428/389; 428/457; 428/469; 174/110 R; 174/118; 427/58; 427/117; 427/126.1; 524/401; 524/403

(58) Field of Classification Search
USPC ................. 428/375, 372, 379, 389, 377, 387
See application file for complete search history.

(56) References Cited

U.S. PATENT DOCUMENTS

| | | | | |
|---|---|---|---|---|
| 2,595,729 A | * | 5/1952 | Swiss et al. ............ | 174/121 SR |
| 3,484,540 A | * | 12/1969 | Brunelle et al. .......... | 174/120 R |
| 3,562,101 A | * | 2/1971 | Tereshko ....................... | 162/138 |
| 3,566,009 A | * | 2/1971 | Lamond et al. ................ | 174/116 |
| 3,697,471 A | * | 10/1972 | Schmidt ........................ | 524/353 |
| 3,776,978 A | * | 12/1973 | Markovitz .................... | 428/416 |
| 3,812,214 A | * | 5/1974 | Markovitz ....................... | 528/92 |
| 3,936,572 A | * | 2/1976 | MacKenzie et al. .......... | 428/379 |
| 4,004,062 A | * | 1/1977 | Peterson ....................... | 428/383 |
| 4,217,389 A | * | 8/1980 | Peterson ....................... | 428/383 |
| 4,513,113 A | * | 4/1985 | Peterson ....................... | 524/602 |
| 4,760,296 A | * | 7/1988 | Johnston et al. ................ | 310/45 |
| 4,770,937 A | * | 9/1988 | Yagyu et al. ................... | 428/383 |
| 5,091,609 A | * | 2/1992 | Sawada et al. ............ | 174/110 A |
| 5,139,820 A | * | 8/1992 | Sawada et al. ................ | 427/120 |
| 5,284,889 A | * | 2/1994 | Pyun et al. ....................... | 524/94 |
| 5,340,641 A | * | 8/1994 | Xu ................................ | 428/209 |
| 5,679,457 A | * | 10/1997 | Bergerson ..................... | 428/344 |
| 5,687,062 A | * | 11/1997 | Larson .......................... | 361/706 |
| 5,774,336 A | * | 6/1998 | Larson .......................... | 361/720 |
| 6,238,790 B1 | * | 5/2001 | Smith et al. ................... | 428/379 |
| 7,420,118 B2 | | 9/2008 | Watanabe et al. | |
| 2004/0245507 A1 | * | 12/2004 | Nagai et al. ................... | 252/500 |

(Continued)

FOREIGN PATENT DOCUMENTS

| | | | |
|---|---|---|---|
| DE | 10059487 A1 | 6/2002 | |
| EP | 0292780 A1 | 11/1988 | |
| EP | 0494424 A1 | 7/1992 | |
| EP | 1191555 A2 | * 3/2002 | |
| WO | WO 2005066252 A2 | * 7/2005 | ............... C08K 3/00 |

*Primary Examiner* — Jill Gray
(74) *Attorney, Agent, or Firm* — Quinn Law Group, PLLC

(57) ABSTRACT

An electrically-insulative coating for minimizing an electrical conductivity of a metal substrate includes a polymer component formed from a monomer precursor, and a powder component substantially dispersed in the polymer component. The powder component is present in the electrically-insulative coating in an amount of from about 5 parts to about 80 parts by weight based on 100 parts by weight of the electrically-insulative coating. The electrically-insulative coating does not substantially degrade when exposed to from about 100 V to about 330 V at a temperature of from about −50° C. to about 500° C., and has a dielectric strength of at least about 2,000 VAC/mil. An electrically-insulative coating system and a method of forming an electrically-insulative coating on a metal substrate are also disclosed.

15 Claims, 1 Drawing Sheet

(56) References Cited

U.S. PATENT DOCUMENTS

| | | | |
|---|---|---|---|
| 2005/0266243 A1* | 12/2005 | Fukuda et al. | 428/375 |
| 2009/0188701 A1* | 7/2009 | Tsuzuki et al. | 174/252 |
| 2011/0151245 A1* | 6/2011 | Wang | 428/332 |
| 2011/0255210 A1* | 10/2011 | Tatemichi et al. | 361/311 |
| 2011/0300393 A1* | 12/2011 | Iio et al. | 428/521 |

* cited by examiner

ELECTRICALLY-INSULATIVE COATING, COATING SYSTEM AND METHOD

TECHNICAL FIELD

The present invention relates to electrically-insulative coatings, and related systems and methods.

BACKGROUND OF THE INVENTION

Alternating current electric motors convert electricity into mechanical energy. More specifically, alternating current electric motors generally include a stationary stator having coil windings supplied with alternating current, and a rotatable rotor coupled to an output shaft. In operation, the rotor rotates to continuously align with a rotating magnetic field produced by the alternating current supplied to the stator windings. As the rotor rotates, the output shaft likewise rotates, and thereby converts electricity into mechanical energy.

For efficient operation, metal components of such alternating current electric motors, such as stator windings and lamination steels, are often coated. For example, copper stator windings of such alternating current electric motors may be coated to minimize electrical conductivity. Likewise, lamination steels may be coated to minimize interlaminar eddy currents.

SUMMARY OF THE INVENTION

An electrically-insulative coating for minimizing an electrical conductivity of a metal substrate includes a polymer component formed from a monomer precursor, and a powder component substantially dispersed in the polymer component. The powder component is present in the electrically-insulative coating in an amount of from about 5 parts to about 80 parts by weight based on 100 parts by weight of the electrically-insulative coating. The electrically-insulative coating does not substantially degrade when exposed to from about 100 V (volts) to about 330 V at a temperature of from about −50° C. to about 500° C. Further, the electrically-insulative coating has a dielectric strength of at least about 2,000 volts alternating current per mil.

An electrically-insulative coating system includes a metal substrate having multiple layers and the electrically-insulative coating disposed on at least one surface of the metal substrate. The electrically-insulative coating includes the polymer component and the powder component substantially dispersed in the polymer component.

A method of forming an electrically-insulative coating on a metal substrate to thereby minimize an electrical conductivity of the metal substrate includes polymerizing a monomer precursor to form a liquid polymer component, and substantially dispersing a powder component in the liquid polymer component. After substantially dispersing, the liquid polymer component including the powder component is applied to the metal substrate. After applying, the liquid polymer component including the powder component is dried to sufficiently transition the liquid polymer component to a solidified gel and thereby form the electrically-insulative coating on the metal substrate.

The electrically-insulative coating of the present invention provides the metal substrate with minimized electrical conductivity and optimized electrical insulation at temperatures of from about −50° C. to about 500° C. As such, the electrically-insulative coating is useful for high-temperature operating environments. Further, the electrically-insulative coating has excellent lubricity and punchability for applications requiring die-cutting of the metal substrate, and excellent adhesion and bending strength for applications requiring metal substrate bending. For applications including stator windings formed from copper wire, the electrically-insulative coating has excellent durability, corrosion resistance, and heat resistance, and therefore exhibits minimized cracking and/or delamination during stator winding forming processes. Likewise, for applications including lamination steels, the electrically-insulative coating minimizes interlaminar eddy currents and has excellent durability, weldability, and corrosion-, heat-, and compression-resistance. Further, the electrically-insulative coating allows for adequate stacking of individual lamination steels. Moreover, the electrically-insulative coating system is useful in oxidative environments and minimizes degradation of magnetic properties of the metal substrate. The method of the present invention also allows for coating formation at a comparatively wider range of temperatures than existing methods. And, the method allows for excellent control of coating thickness. As such, the method is versatile and cost-effective.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
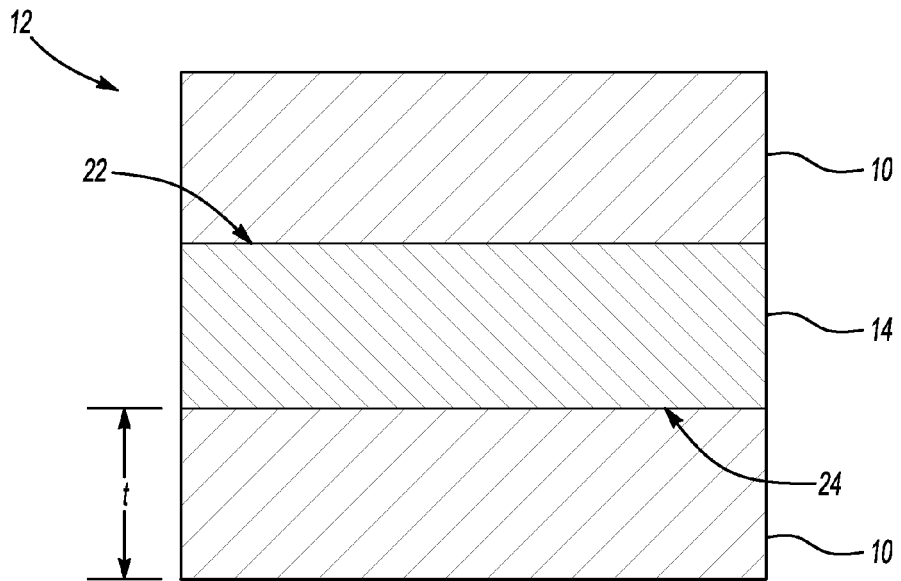
FIG. 1 is a cross-sectional schematic view of an electrically-insulative coating system including an electrically-insulative coating disposed on multiple surfaces of a metal substrate.

Referring to FIG. 1, the present invention includes an electrically-insulative coating 10 and coating system 12, and a method of forming an electrically-insulative coating 10 on a metal substrate 14. The electrically-insulative coating 10 minimizes an electrical conductivity of the metal substrate 14. Therefore, the electrically-insulative coating 10 may be useful for automotive applications such as, but not limited to, stator coils and/or lamination steels for electrical motors. However, the electrically-insulative coating 10 may also be useful for non-automotive applications, such as, but not limited to, motors and generators for appliances and industrial machinery.

By way of general explanation, the electrically-insulative coating 10 is a material that substantially resists flow of electric current, e.g., alternating electric current. Therefore, the electrically-insulative coating 10 may be useful as a non-conducting material when applied to the metal substrate 14.

Referring to FIG. 1, the electrically-insulative coating 10 includes a polymer component formed from a monomer precursor. The monomer precursor may be selected from any suitable polymerizable monomer. For example, the monomer precursor may be a metal alkoxide, such as, but not limited to, tetraethyl orthosilicate. Alternatively, the monomer precursor may be a metal salt, e.g., an inorganic metal salt including an element from one of Groups 3-11 of the periodic table of the elements. In one example, the monomer precursor may be copper chloride.

The polymer component may be formed via any suitable polymerization reaction. For example, for applications including tetraethyl orthosilicate as the monomer precursor, the tetraethyl orthosilicate may undergo hydrolysis under acidic conditions to form water, an alcohol, and a network of siloxane bonds, i.e., the polymer component.

The electrically-insulative coating 10 also includes a powder component substantially dispersed in the polymer component. That is, the powder component is substantially distributed throughout the polymer component. The powder component is present in the electrically-insulative coating 10 to provide optimal bending strength, stability at elevated temperatures, and electrical insulation to the electrically-insulative coating 10. As used herein, the terminology "bending strength" of the electrically-insulative coating 10 generally refers to a radius of curvature corresponding to a given degree of breakdown of the electrically-insulative coating 10. The breakdown of the electrically-insulative coating 10 during tests is manifested externally in a gradual increase in the number of cracks in the electrically-insulative coating 10 and/or in flaking.

The powder component is present in the electrically-insulative coating 10 in an amount of from about 5 parts to about 80 parts by weight based on 100 parts by weight of the electrically-insulative coating 10. More specifically, the powder component may be present in the electrically-insulative coating 10 in an amount of from about 5 parts to about 40 parts by weight based on 100 parts by weight of the electrically-insulative coating 10. In one example, the powder component may be present in the electrically-insulative coating 10 in an amount of from about 10 parts to about 30 parts by weight based on 100 parts by weight of the electrically-insulative coating 10. At amounts less than about 5 parts by weight of the powder component, the electrically-insulative coating 10 may degrade at elevated temperatures, i.e., temperatures of from 200° C. to 400° C. Likewise, at amounts of greater than about 80 parts by weight of the powder component, the electrically-insulative coating 10 may not exhibit optimal bending strength.

The powder component may include an oxide. For example, the powder component may be selected from the group including $SiO_2$, $Cr_2O_3$, $MgO$, $Al_2O_3$, and combinations thereof. Alternatively or additionally, the powder component may include a nitride. For example, the powder component may be selected from the group including BN, $Si_3N_4$, TiN, $Cu_3N$, and combinations thereof.

Further, the powder component may have an average particle size of from about 1 nm to about 50 μm. Additionally, the powder component may include differently-sized particles. For example, the powder component may include a first constituent having an average particle size of from about 1 nm to about 100 nm and a second constituent having an average particle size of from about 0.1 μm to about 50 μm. Without intending to be limited by theory, powder components having comparatively smaller average particle sizes may agglomerate more readily than powder components having comparatively larger average particle sizes. As such, the first constituent and/or the second constituent may optionally be pretreated with a non-agglomeration agent, such as, but not limited to, solvents, surfactants, and the like. The non-agglomeration agent may also enhance the substantial dispersion of the powder component in the polymer component of the electrically-insulative coating 10. Moreover, powder components including both the first constituent and the second constituent may exhibit comparatively greater bending strength than powder components substantially free from one of the first constituent and the second constituent.

The electrically-insulative coating 10 may also include an additive. By way of non-limiting examples, the additive may be selected from the group including polyurethanes, such as thermoplastic polyurethanes; alkylene oxides, such as propylene oxide; wetting agents, such as surfactants; colorants, such as dyes; and combinations thereof. In particular, polyurethanes and/or alkylene oxides may be included in the electrically-insulative coating 10 to improve bending strength. Further, wetting agents may be included in the electrically-insulative coating 10 to ensure substantial dispersion of the powder component within the polymer component. And, colorants may be included in the electrically-insulative coating 10 to distinguish the source of the electrically-insulative coating 10.

Referring again to FIG. 1, the electrically-insulative coating system is shown generally at 12. In particular, the electrically-insulative coating system 12 includes the electrically-insulative coating 10 and the metal substrate 14. The electrically-insulative coating 10 is disposed on the metal substrate 14 and includes the polymer component and the powder component substantially dispersed in the polymer component, as set forth above.

Figure 2:
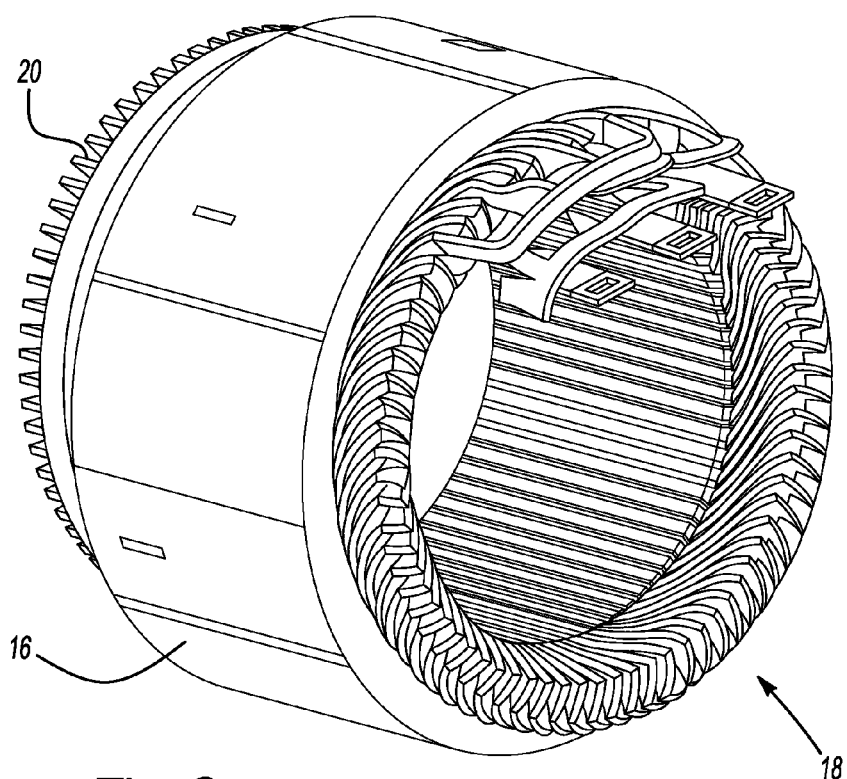
FIG. 2 is a perspective schematic view of a stator assembly of an electric motor, including a laminated core and a stator winding, each coated at least partially with the electrically-insulative coating of FIG. 1.

Referring to FIG. 1, the metal substrate 14 may be formed from any metal suitable for a desired application. Likewise, the metal substrate 14 may be configured in any shape. For example, the metal substrate 14 may be in the form of cold-rolled strips of lamination steel stacked together as a core for use within an electric motor, such as to form a rotor of an electric motor. As used herein, the terminology "lamination steel" refers to steel, often including silicon, tailored to produce desired magnetic properties, e.g., low energy dissipation per cycle and/or high permeability, and suitable for carrying magnetic flux. For example, lamination steels may be die cut into circular layers having a thickness of less than or equal to about 2 mm. Referring to FIG. 2, the circular layers may then be stacked adjacent one another to form a laminated core 16 of a stator assembly 18 of an electric motor (not shown). As such, the electrically-insulative coating 10 may have excellent lubricity and be suitable for applications requiring die-cutting and/or punching of the metal substrate 14 (FIG. 1). For example, the electrically-insulative coating 10 may minimize burrs from dull die-cutting and/or punching tools. Without intending to be limited by theory, it is believed that the substantial dispersion of the powder component in the polymer component of the electrically-insulative coating 10 provides the aforementioned lubricity.

Since lamination steels often include silicon, lamination steels may be susceptible to degradation in an oxidizing operating environment. However, the electrically-insulative coating 10 provide an excellent protective layer for the metal substrate 14. That is, since the powder component is substantially dispersed in the polymer component, the electrically-insulative coating 10 reduces subsurface oxidation of the metal substrate 14, without affecting the desired magnetic properties of the lamination steel.

Further, for applications including lamination steels, the electrically-insulative coating 10 minimizes interlaminar eddy currents. That is, the electrically-insulative coating 10 minimizes eddy current formation between individual lamination steels. Additionally, the electrically-insulative coating 10 provides excellent corrosion-, heat-, and compression-resistance and weldability. That is, the electrically-insulative coating 10 may withstand large compressive forces during stacking of individual lamination steels to form the laminated core 16. Likewise, individual lamination steels including the electrically-insulative coating 10 are weldable during formation of the laminated core 16. Therefore, the electrically-insulative coating 10 increases magnetic core stability and contributes to an excellent stacking factor of the magnetic core, which thereby decreases electric motor noise during operation and minimizes magnetic core loss.

In another example, referring again to FIGS. 1 and 2, the metal substrate 14 (FIG. 1) may be copper wire configured for use as a stator winding 20 (FIG. 2) of an electric motor (not shown). The copper wire may be bent and/or woven into any configuration to form the stator winding 20. Advantageously, the electrically-insulative coating 10 may not substantially separate from the metal substrate 14 when the metal substrate 14 is folded. That is, the electrically-insulative coating 10 has excellent adhesion to the metal substrate 14 and optimal bending strength. Without intending to be limited by theory, it is believed that the powder component of the electrically-insulative coating 10 provides such excellent adhesion and bending strength.

Referring again to FIG. 1, the electrically-insulative coating 10 may be disposed on multiple surfaces, which may be two opposite surfaces 22, 24, of the metal substrate 14. However, the electrically-insulative coating 10 may also be disposed on only one surface 22, or on more than two surfaces 22, 24 of the metal substrate 14 depending on the configuration of the metal substrate 14. That is, although not shown, the metal substrate 14 may be entirely coated by the electrically-insulative coating 10, and formed via, for example, dip-coating the metal substrate 14, as set forth in more detail below.

For applications including stator windings 20, the electrically-insulative coating 10 optimizes a voltage endurance of the metal substrate 14. As used herein, the terminology "voltage endurance" refers to an electrical insulation property expressing a relationship between voltage and expected life of the electrically-insulative coating 10. That is, voltage endurance may be understood as the duration of time before dielectric breakdown occurs upon exposure to a voltage, as determined in accordance with the IEEE 1043 test method. Stated differently, voltage endurance is a maximum voltage that can be applied to the electrically-insulative coating 10 indefinitely without damage.

In particular, the electrically-insulative coating 10 does not substantially degrade when exposed to from about 100 V to about 330 V at a temperature of from about −50° C. to about 500° C. That is, the electrically-insulative coating 10 has excellent voltage endurance and is suitable for use in high-temperature operating environments, e.g., for use with electric motors for automotive applications. Additionally, the electrically-insulative coating 10 has a dielectric strength of at least about 2,000 volts alternating current (VAC) per mil (1 mil=0.001 inch). That is, the electrically-insulative coating 10 is an excellent electrical insulator. Additionally, the electrically-insulative coating 10 is substantially free from $Cr^{6+}$ ions, and substantially no metallic Cr ions are involved in the processing of the electrically-insulative coating 10. As such, the electrically-insulative coating 10 is suitable for use in oxidative environments, as set forth in more detail below.

For the electrically-insulative coating system 12, the electrically-insulative coating 10 may have a thickness, t (FIG. 1), of from about 0.1 μm to about 500 μm. For example, for applications including copper wire configured for use as the stator winding 20 (FIG. 2), the electrically-insulative coating 10 may have a thickness, t, of from about 20 μm to about 500 μm so as to provide the aforementioned dielectric strength and voltage endurance, without interfering with the desired magnetic properties of the lamination steel. Therefore, the coating system 12 may minimize degradation of the magnetic properties of the metal substrate 14.

Likewise, referring to FIG. 2, for applications including lamination steel as the laminated core 16 of a stator assembly 18, the electrically-insulative coating 10 may have a thickness, t (FIG. 1), of from about 0.3 μm to about 5 μm. That is, the electrically-insulative coating 10 may be substantially thicker for applications requiring coated copper wire so as to provide the aforementioned electrical insulation to the metal substrate 14.

A method of forming the electrically-insulative coating 10 on the metal substrate 14 to thereby optimize a voltage endurance of the metal substrate 14 includes polymerizing the monomer precursor to form a liquid polymer component, i.e., the polymer component set forth above. As used herein, polymerizing refers to forming polymer networks by chemically reacting molecules of the monomer precursor with each other so that the liquid polymer component may be a dispersion of colloidal particles. Polymerizing the monomer precursor may include any suitable reaction mechanism, such as, but not limited to, hydrolysis and condensation. Further, the reaction mechanisms may be base- or acid-catalyzed.

The method further includes substantially dispersing the powder component in the liquid polymer component. That is, the powder component may be mixed in the liquid polymer component in an amount of from about 5 parts to about 80 parts by weight of the powder component based on 100 parts by weight of the liquid polymer component. More specifically, the powder component may be present in the liquid polymer component in an amount of from about 5 parts to about 40 parts by weight based on 100 parts by weight of the liquid polymer component. In one example, the powder component may be present in the liquid polymer component in an amount of from about 10 parts to about 30 parts by weight based on 100 parts by weight of the liquid polymer component.

The powder component may be substantially dispersed via any suitable equipment. For example, the powder component may be added to the liquid polymer component and mixed with a paddle mixer, agitator, and/or blender so as to substantially disperse the powder component. Preferably, the powder component is substantially dispersed so as to be uniformly distributed within the liquid polymer component.

After substantially dispersing, the liquid polymer component including the powder component is applied to the metal substrate 14 (FIG. 1). For example, the liquid polymer component including the powder component may be applied to the metal substrate 14 by dip-coating, spin-coating, spraying, inkjet printing, roll-coating, plate printing, and combinations thereof. For applications including the copper wire stator winding 20 (FIG. 2), the liquid polymer component including the powder component may be applied via dip-coating the metal substrate 14 (FIG. 1), i.e., the copper wire stator winding 20. Alternatively, for applications including lamination steels, the liquid polymer component including the powder component may be applied via spraying or dip-coating.

After applying, the liquid polymer component is dried, e.g., heated, to sufficiently transition the liquid polymer component to a solidified gel and thereby form the electrically-insulative coating 10 on the metal substrate 14. That is, the liquid polymer component including the powder component may be heated at ambient temperature to dry and remove remaining liquid. As the drying progresses, the liquid polymer component including the powder component transitions, i.e., evolves, from a liquid to a solidified gel through densification and accompanying increases in rigidity. That is, the solidified gel may be an interconnected polymeric network formed via polymer assembly of the liquid polymer component. The thickness, t (FIG. 1), of the electrically-insulative coating 10 may be controlled by varying the amount and/or the viscosity of liquid polymer component including the powder component that is applied to the metal substrate 14. For example, for applications requiring a comparatively thick electrically-insulative coating 10, comparatively more liquid polymer component including the powder component is applied to the metal substrate 14 prior to drying.

For some applications, the method may also include stamping the metal substrate 14 (FIG. 1) after sufficient drying. For example, for applications including lamination steel, the liquid polymer component including the powder component may be applied to the metal substrate 14 via roll-coating or spraying. After sufficient drying, when the liquid polymer component including the powder component has sufficiently transitioned to the solidified gel to form the electrically-insulative coating 10 on the lamination steel, the lamination steel may be stamped to a desired shape. Since the electrically-insulative coating 10 has excellent lubricity, as set forth above, the method may be useful for applications requiring stamped or die-cut metal substrates 14. That is, the electrically-insulative coating 10 may not deform and/or separate, e.g., delaminate, from the metal substrate 14 during stamping operations.

For other applications, the method may include configuring the metal substrate 14 (FIG. 1) into a desired shape before drying, e.g., heating, the liquid polymer component including the powder component to thereby form the electrically-insulative coating 10. In particular, for applications including the copper wire stator winding 20 (FIG. 2), cooper wire may be dip-coated in the liquid polymer component including the powder component, bent and/or woven to form the stator winding 20, and then dried to sufficiently transition to the solidified gel and thereby form the electrically-insulative coating 10. That is, the dip-coated stator winding 20 may require drying, e.g., heating, after fabrication of the stator assembly 18 to form the electrically-insulative coating 10.

For the method, the liquid polymer component including the powder component may be referred to as "sol" and the solidified gel may be referred to as "gel". Therefore, the method may be generally described as a "sol-gel" method of forming the electrically-insulative coating 10, i.e., a chemical solution deposition method. The method allows for electrically-insulative coating formation at ambient temperatures, which simplifies coating formation and minimizes energy costs of the method. And, the method allows for excellent control of electrically-insulative coating thickness, t, which can be adjusted via the viscosity of the liquid polymer component including the powder component. As such, the method is versatile and cost-effective.

While the best modes for carrying out the invention have been described in detail, those familiar with the art to which this invention relates will recognize various alternative designs and embodiments for practicing the invention within the scope of the appended claims.

The invention claimed is:

1. An electrically-insulative coating for minimizing an electrical conductivity of a metal substrate, the electrically-insulative coating comprising:
   a polymer of an inorganic metal salt, wherein said inorganic metal salt includes an element selected from Groups 3-11 of the periodic table of the elements; and
   a powder component substantially dispersed in said polymer;
   wherein said powder component is present in the electrically-insulative coating in an amount of from about 5 parts to about 80 parts by weight based on 100 parts by weight of the electrically-insulative coating;
   wherein the electrically-insulative coating does not substantially degrade when exposed to from about 100 V to about 330 V at a temperature of from about −50° C. to about 500 ° C.;
   wherein the electrically-insulative coating has a dielectric strength of at least about 2,000 volts alternating current per mil.

2. The electrically-insulative coating of claim 1, wherein said powder component is present in the electrically-insulative coating in an amount of from about 5 parts to about 40 parts by weight based on 100 parts by weight of the electrically-insulative coating.

3. The electrically-insulative coating of claim 1, wherein said powder component includes an oxide.

4. The electrically-insulative coating of claim 1, wherein said powder component includes a nitride.

5. The electrically-insulative coating of claim 1, wherein said powder component includes a first constituent having an average particle size of from about 1 nm to about 100 nm and a second constituent having an average particle size of from about 0.1 μm to about 50μm.

6. An electrically-insulative coating system comprising:
   a metal substrate having multiple surfaces; and
   an electrically-insulative coating disposed on at least one surface of said metal substrate and comprised of;
      a polymer of an inorganic metal salt, wherein said inorganic metal salt includes an element selected from Groups 3-11 of the periodic table of the elements; and
      a powder component substantially dispersed in said polymer;
   wherein said powder component is present in said electrically-insulative coating in an amount of from about 5 parts to about 80 parts by weight based on 100 parts by weight of said electrically-insulative coating;
   wherein said electrically-insulative coating does not substantially degrade when exposed to from about 100V to about 330V at a temperature of from about −50° C. to about 500° C.;
   wherein said electrically-insulative coating has a dielectric strength of at least about 2,000 volts alternating current per mil.

7. The electrically-insulative coating system of claim 6, wherein said electrically-insulative coating has a thickness of from about 0.1μm to about 500 μm.

8. The electrically-insulative coating system of claim 6, wherein said electrically-insulative coating does not substantially separate from said metal substrate when said metal substrate is folded.

9. The electrically-insulative coating system of claim 6, wherein said electrically-insulative coating is disposed on two surfaces of said metal substrate.

10. The electrically-insulative coating system of claim 6, wherein said metal substrate is lamination steel configured for use within an electric motor.

11. The electrically-insulative coating system of claim 6, wherein said metal substrate is copper wire configured for use as a stator winding of an electric motor.

12. A method of forming an electrically-insulative coating on a metal substrate to thereby minimize an electrical conductivity of the metal substrate, the method comprising:
   polymerizing an inorganic metal salt to form a liquid polymer, wherein the inorganic metal salt includes an element selected from Groups 3-11 of the periodic table of the elements;

substantially dispersing a powder component in the liquid polymer;

after substantially dispersing, applying the liquid polymer including the powder component to the metal substrate;

after applying, drying the liquid polymer including the powder component to sufficiently transition the liquid polymer to a solidified gel and thereby form the electrically-insulative coating on the metal substrate.

13. The method of claim 12, wherein substantially dispersing is further defined as mixing the powder component in the liquid polymer in an amount of from about 5 parts to about 80 parts by weight of the powder component based on 100 parts by weight of the liquid polymer.

14. The method of claim 12, wherein applying is selected from the group comprising dip-coating, spin-coating, spraying, inkjet printing, roll-coating, plate printing, and combinations thereof.

15. The method of claim 12, further including stamping the metal substrate after sufficient drying.

* * * * *